United States Patent [19]

Cohen et al.

[11] Patent Number: 4,593,050

[45] Date of Patent: Jun. 3, 1986

[54] ULTRAVIOLET LIGHT ASSISTED FLUORINATION OF POLYMER SURFACES

[75] Inventors: Robert E. Cohen, Jamaica Plain; George C. Corbin, Salem; Raymond F. Baddour, Belmont, all of Mass.

[73] Assignee: Massachusetts Institute of Technology, Cambridge, Mass.

[21] Appl. No.: 517,121

[22] Filed: Jul. 25, 1983

[51] Int. Cl.$^4$ .................................................. C08J 3/28
[52] U.S. Cl. ........................................ 522/2; 427/54.1; 522/127; 522/131; 522/133; 522/147; 522/157; 522/161; 522/913; 522/914; 522/915; 525/355; 525/356
[58] Field of Search ............ 204/159.19, 159.2, 159.18, 204/169; 525/276, 355, 356; 427/54.1, 400

[56] References Cited

U.S. PATENT DOCUMENTS

| | | | |
|---|---|---|---|
| 2,829,070 | 4/1958 | Osborn | 204/159.18 |
| 3,442,780 | 5/1969 | Levine | 525/276 |
| 3,639,510 | 2/1972 | Paine | 525/276 |
| 3,740,325 | 6/1973 | Manion et al. | 204/169 |
| 3,988,491 | 10/1976 | Dixon et al. | 427/400 |
| 4,264,750 | 4/1981 | Anand et al. | 204/159.18 |
| 4,310,564 | 1/1982 | Imada et al. | 204/169 |

FOREIGN PATENT DOCUMENTS 750923 6/1956 United Kingdom ................ 525/276

OTHER PUBLICATIONS

Chemical Abstracts, vol. 80, No. 12, 1974, p. 29, No. 60590d.

*Primary Examiner*—Allan M. Lieberman
*Attorney, Agent, or Firm*—Paul J. Cook; Arthur A. Smith, Jr.

[57] ABSTRACT

Fluorinated polymer surfaces are provided by a process in which ultraviolet radiation is used to assist the surface fluorination reaction.

8 Claims, 3 Drawing Figures

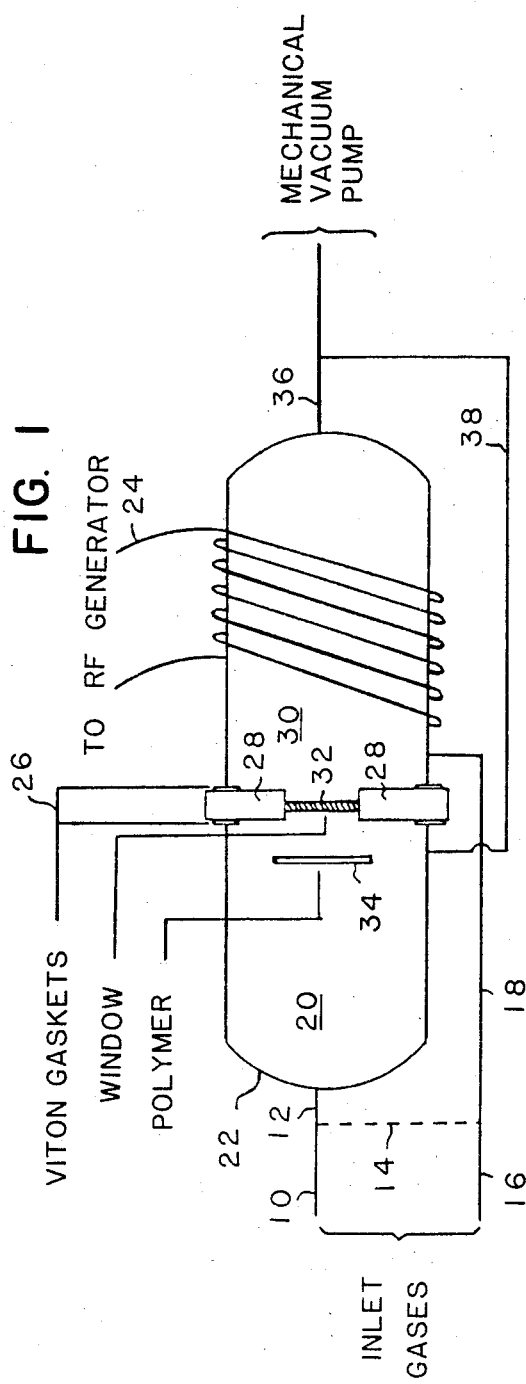
FIG. 1
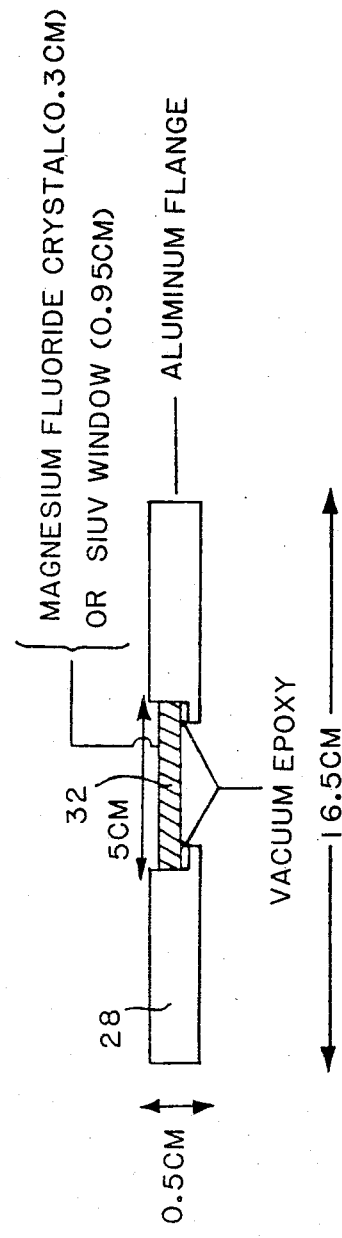

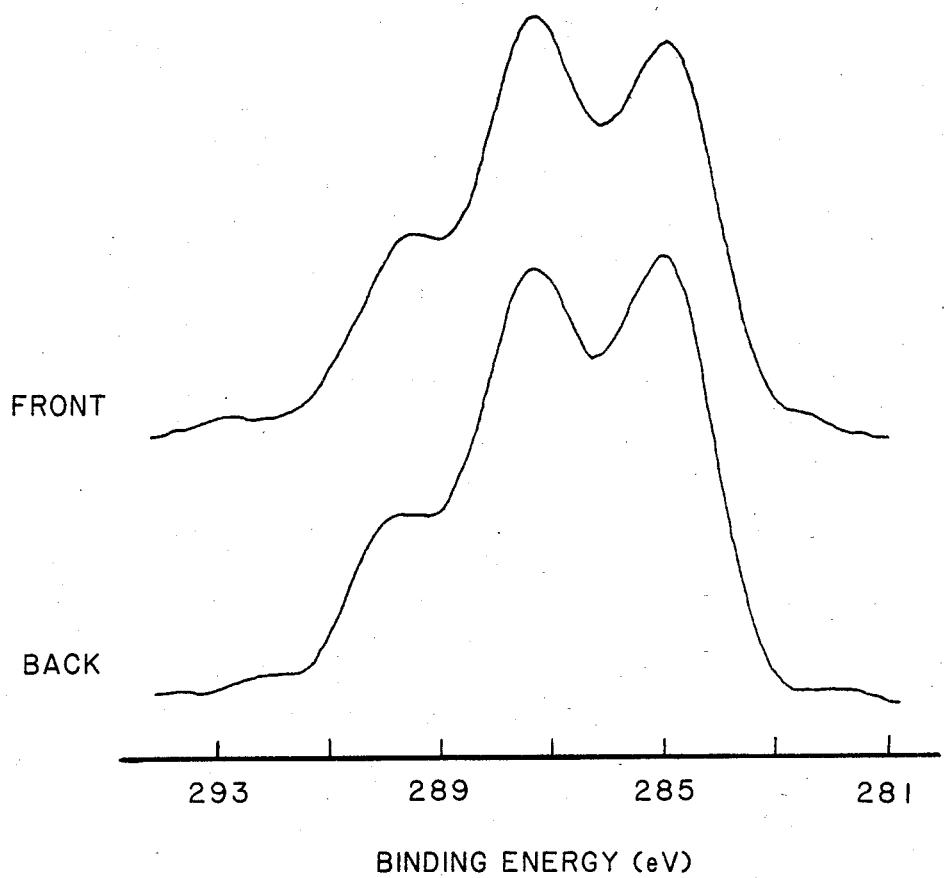
FIG. 2 (RUN 2)

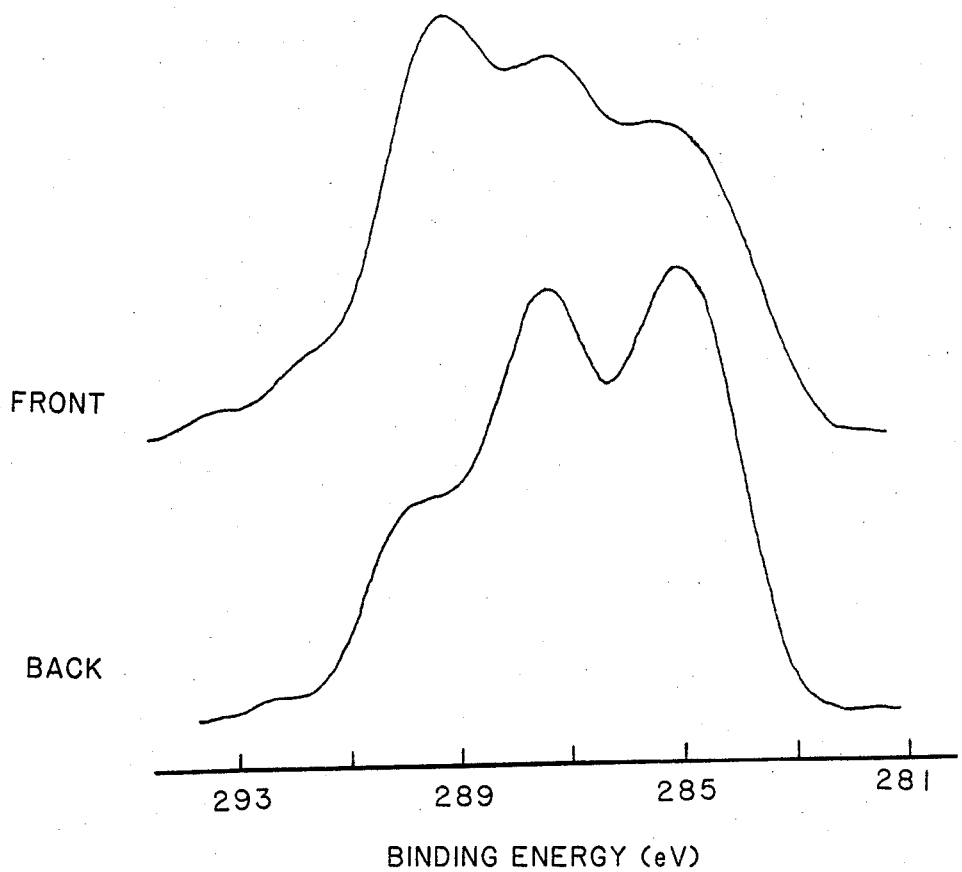
FIG. 3 (RUN 3)

ULTRAVIOLET LIGHT ASSISTED FLUORINATION OF POLYMER SURFACES

The Government has rights in this invention pursuant to Grant No. 8025302-CPE awarded by the National Science Foundation.

BACKGROUND OF THE INVENTION

The present invention relates to a process for surface fluorinating polymers to form substantially fluorinated surfaces and to the fluorinated polymers so-produced.

Prior to the present invention, attempts have been made to fluorinate polymers utilizing fluorine gas. Unfortunately, when utilizing fluorine under relatively mild conditions of temperature, pressure and fluorine concentration, wherein polymer degradation is not substantial, the reaction time to effect fluorination is relatively large as shown by Clark et al, Journal of Polymer Science: Polymer Chemistry Edition, Volume 13, pages 857–890 (1975). The products of prior fluorination procedures utilizing fluorine gas include a number of species containing only partial fluorine substitution for hydrogen. This is also undesirable since the presence of hydrogen tends to increase the free energy of the polymer surface, thereby not forming low energy surfaces of the type that characterize perfluorinated polymers. An improved surface fluorination process has been proposed in U.S. Pat. No. 4,264,750 to fluorinate hydrocarbon or amide polymers by exposing the polymer to a source of fluorine in a cold plasma. The present invention offers an alternative process using ultraviolet radiation to substantially assist the fluorination in the surface region of the polymer.

SUMMARY OF THE INVENTION

This invention is based upon the discovery that polymer surfaces can be fluorinated up to complete perfluorination to generate low energy surfaces. The completely perfluorinated surfaces contain little or no hydrogen and may also contain little or no oxygen depending upon the type of polymer being treated. These surfaces are formed by exposing an organic polymer to ultraviolet radiation and a source of fluorine, diluted in an inert gas if desirable. The reaction is conducted at a temperature, total pressure, and fluorine concentration such that the desired fluorination is effected without substantial degradation of the polymer surface. By utilizing ultraviolet radiation in accordance with this invention, fluorination of the polymer surface can be effected rapidly, so that the polymer degradation and detrimental reaction with oxygen are minimized or eliminated.

BRIEF DESCRIPTION OF THE DRAWING

FIG. 1 is a schematic diagram of an apparatus useful for this invention.

FIG. 2 demonstrates the effect of radiation about 180 nm for enhancing fluorination.

FIG. 3 demonstrates the effect of radiation about 115 nm for enhancing the fluorination reaction.

DESCRIPTION OF SPECIFIC EMBODIMENTS

In accordance with this invention, the surface of a polymer is contacted with a fluorine-containing gas while also being exposed to ultraviolet radiation. The radiation assists the reaction by liberating fluorine atoms from the fluorine-containing gas and/or by creating reactive species in the polymer phase which can then react with the fluorine-containing gas. The ultraviolet radiation that can be used generally has a wavelength of less than 400 nm, preferably less than the absorption limit of the polymer (e.g., less than 160 nm for polyethylene). The source of fluorine can comprise fluorine gas, sulfur hexafluoride, nitrogen trifluoride, or any fluorine-containing gas that will donate a fluorine atom to reactive polymer sites or that will liberate atomic fluorine upon exposure to ultraviolet radiation.

The temperature at which reaction is effected is less than that which causes degradation to the polymer substrates while permitting substantially complete replacement, in the surface region, of the hydrogen atoms with fluorine atoms. It has been found that high concentrations of fluorine gas ($F_2$) may cause degradation or combustion of the polymers. Therefore, when using fluorine gas as the fluorinating agent, it is often desirable to reduce the partial pressure of fluorine by dilution with an inert gas and/or operating at a reduced pressure. Accordingly, in order to control the reaction temperature, it is necessary to control the concentration of fluorine gas in the reactor as well as the total pressure within the reactor. Therefore, in accordance with this invention, reaction is effected at a temperature below the melting point of the polymer (e.g., 115° C. for polyethylene). The reaction is conducted substantially free of species such as oxygen which would react in competition with the fluorine-containing gas.

The process of this invention is useful to form low energy perfluorinated polymer surfaces. By utilizing the technique of this invention, it is possible to provide low energy surfaces from relatively inexpensive polymeric materials, e.g., hydrocarbon polymers including polyethylene, polypropylene, polystyrene, polyisobutylene or copolymers of polyethylene and polypropylene or polyamides, polyesters, polyvinyl chloride, polystyrene, synthetic rubber, polysiloxanes or the like, rather than forming articles from relatively expensive fluoropolymers. The products obtained by the present invention comprise a low energy surface which is in the order of about 5 to 10,000 Angstroms thick rather than products which are fluorinated throughout their thickness. The process of the present invention provides novel products since the surface of the polymer can be completely fluorinated in that most of the hydrogen atoms have been replaced by fluorine atoms. The remainder of the treated article comprises the original polymer since the interior portions of the articles do not interact with the ultraviolet radiation. The partially fluorinated polymers are characterized by high energy surfaces or can be rendered wettable. The polymers are characterized by less crosslinking and less surface abrasion as compared to the fluorinated polymers of the prior art.

A reactor design convenient for this invention will be more fully described with reference to FIG. 1. The quartz or pyrex reactor 22 is divided into two regions, 20 and 30. Zone 20 contains the polymer to be reacted 34, the fluorine-containing gas and a diluent gas if desired. Zone 30 is the ultraviolet radiation source, which is a plasma activated by a radio frequency generator (not shown) coupled by copper induction coils 24. The two chambers are connected with a gasketed 26 aluminum flange 28 with a UV transmitting window 32 in the center. The UV gas source (e.g., hydrogen) is supplied through conduits 16 and 18 while the fluorine-containing gas is supplied through conduits 10 and 12. If the same gas/gas mixture is desired in both zones, conduits 10, 12, 14 and 18 are used. Both zones are maintained at sub-atmospheric pressure by a vacuum pump (not shown) which is connected to zone 20 by conduit 38 and zone 30 by conduit 36. The UV radiation emitted in zone 30 passes through window 32 and is absorbed by the gas and polymer 34 in zone 20.

The ultraviolet radiation can be obtained from any convenient source such as a UV lamp, UV laser or plasma electrical discharge.

EXAMPLE I

The apparatus shown in FIG. 1 was utilized to obtain the results described in this example. The plasma UV source was generated by an inductively coupled radio frequency (13.56 MHz) generator.

In a typical experiment, a polymer film (e.g., polyethylene) was placed in zone 20, perpendicular to the long axis of the reactor. This reaction chamber 22 was then evacuated with a mechanical vacuum pump such that an air tight seal was obtained with the viton gaskets 26, the flange 28, and reactor zones 20 and 30. When the reactor had been evacuated, a mixture of fluorine gas ($F_2$) and a diluent gas (e.g., helium or argon) was introduced into both zones or, alternatively, a different gas was introduced into the plasma zone 30. When the pressure and flows had stabilized, the plasma was ignited within zone 30. Partial fluorination occurred on both sides of the polymer due to the usual slow reaction of elemental fluorine with polymer surfaces. However, a comparison of the relative extents of fluorination on both sides, as determined by X-ray photoelectron spectroscopy, determined the effectiveness of the UV radiation of enhancing the fluorination reaction.

The surface analysis of the treated polymers utilized X-ray photoelectron spectroscopy (XPS or ESCA). The information extracted from this analysis was obtained from high resolution spectra of the Carbon 1speak. This data allowed for determination of the relative amounts of molecular species within the surface region. Specifically, $CF_2$, $CHF$, and $CH_2$ type structures were observed.

Two different UV transmitting windows were used in this example. A fused silica (SlUV) window having a transmission cutoff of about 180 nm (i.e., only wavelengths above this value pass through the window) was used to determine enhancement in reaction due to the photodissociation of fluorine molecules into more reactive fluorine atoms. This process occurs at wavelengths between 210 and 360 nm. A magnesium fluoride crystal ($MgF_2$) with a transmission limit of about 115 nm was used to determine enhancement in reaction due to increased reactivity of the polymer. For example, polyethylene will absorb photons at wavelengths less than 160 nm.

The reacting gases utilized in this example were 5% $F_2$ in helium and 5% $F_2$ in argon; plasma gases included 5% $F_2$ in helium, 5% $F_2$ in argon, and pure hydrogen. Both low density polyethylene and polystyrene films were investigated as polymer substrates. Reaction time was 60 minutes. The pressure in both zones was about $3.9 \times 10^{-2}$ psig (2 torr). Generally, flow rates were 50 cm$^3$ (STP)/min.

ESCA spectra of two experiments are shown in FIGS. 2 and 3. Both figures were obtained from fluorination of low density polyethylene with 5% $F_2$ in helium. The "front" is the side of the polymer film facing the UV source; the "back" of the films were not exposed to UV radiation. FIG. 2 demonstrates the effect of radiation above 180 nm at enhancing the fluorination reaction. FIG. 3 demonstrates the effect of radiation above 115 nm at enhancing the fluroination reaction. From this type of data, Table I was prepared which lists the relative increase in $CF_2$ composition due to UV irradiation. Both windows allow for improved reaction rates, however, the $MgF_2$ crystal appears to be much more successful. These data indicate that photodissociation of fluorine molecules and/or photoexcitation/photoionization of the polymer are effective at enhancing the surface fluorination of polymers. Note that the reactor design in these experiments was utilized for its convenience and versatility. Optimization of reactor design, allowing for higher radiation fluxes in the regions of interest, should lead to even more dramatic fluorination rates.

TABLE I

| Run | Polymer | Reacting Gas | Plasma Gas | Window | Reaction Time | Relative increase in $CF_2$ Composition |
|---|---|---|---|---|---|---|
| 1 | LDPE | $F_2$/He | — | — | 60 Min | control expt. |
| 2 | LDPE | $F_2$/He | $F_2$/He | Fused Silica* | 60 Min | 13% |
| 3 | LDPE | $F_2$/He | $F_2$/He | $MgF_2$ | 60 Min | 154% |
| 4 | LDPE | $F_2$/Ar | $F_2$/Ar | $MgF_2$ | 60 Min | 59% |
| 5 | LDPE | $F_2$/He | $H_2$ | Fused Silica* | 60 Min | 16% |
| 6 | LDPE | $F_2$/He | $H_2$ | $MgF_2$ | 60 Min | 182% |
| 7 | PS | $F_2$/He | $F_2$/He | Fused Silica* | 60 Min | 11% |
| 8 | PS | $F_2$/He | $F_2$/He | $MgF_2$ | 60 Min | 110% |

*Also referred to by its commercial designation, SIUV

We claim:

1. The process for fluorinating a polymer to form a fluorinated polymer surface which comprises generating an ultraviolet light having a wave length of less than 400 nm and less than the absorption limit of the polymer in a first zone, contacting the surface of said polymer with a fluorinated gaseous species selected from the group consisting of fluorine, tetrafluoromethane, hydrogen fluoride, hexafluoroethane, sulfur hexafluoride, difluoromethane, trifluoromethane and mixtures thereof and a diluent gas in a second reactor zone, exposing said polymer to said ultraviolet light from said first zone under conditions to effect fluorination of the surface of said polymer at a temperature below the melting point of said polymer.

2. The process of claim 1 wherein the ultraviolet light is generated with an ultraviolet laser.

3. The process of claim 1 wherein said fluorinated non-hydrogenated species is fluorine.

4. The process of claim 1 wherein the ultraviolet light is generated with an ultraviolet lamp.

5. The process of any one of claims 1, 2, 3 or 4 wherein said polymer is polyethylene.

6. The process of any one of claims 1, 2, 3 or 4 wherein said polymer is polypropylene.

7. The process of any one of claims 1, 2, 3 or 4 wherein said polymer is a polyamide.

8. The process of claim 1 wherein the polymer is substantially completely fluorinated.

* * * * *